(12) United States Patent
Linzer (10) Patent No.: US 7,630,565 B2
(45) Date of Patent: Dec. 8, 2009

(54) PARALLEL VIDEO ENCODER WITH WHOLE PICTURE DEBLOCKING AND/OR WHOLE PICTURE COMPRESSED AS A SINGLE SLICE

(75) Inventor: Elliot N. Linzer, Suffern, NY (US)

(73) Assignee: LSI Corporation, Milpitas, CA (US)

( * ) Notice: Subject to any disclaimer, the term of this patent is extended or adjusted under 35 U.S.C. 154(b) by 777 days.

(21) Appl. No.: 10/999,825

(22) Filed: Nov. 30, 2004

(65) Prior Publication Data

US 2006/0114985 A1    Jun. 1, 2006

(51) Int. Cl.
*G06K 9/46* (2006.01)
(52) U.S. Cl. ...................................... 382/234
(58) Field of Classification Search ................. 382/173, 382/232, 234, 236; 370/464, 498, 537, 538, 370/540; 375/240, 240.01, 240.25
See application file for complete search history.

(56) References Cited

U.S. PATENT DOCUMENTS

| | | | | |
|---|---|---|---|---|
| 4,704,629 A | * | 11/1987 | Vreeswijk et al. | 375/240.25 |
| 5,864,583 A | * | 1/1999 | Ozkan | 375/242 |
| 6,909,745 B1 | * | 6/2005 | Puri et al. | 375/240.01 |
| 2004/0190626 A1 | * | 9/2004 | Sun et al. | 375/240.18 |
| 2004/0258104 A1 | * | 12/2004 | Li | 370/537 |

* cited by examiner

*Primary Examiner*—Samir A. Ahmed
*Assistant Examiner*—Atiba O Fitzpatrick
(74) *Attorney, Agent, or Firm*—Christopher P. Maiorana, PC (57) ABSTRACT

An apparatus comprising (i) a segmentor circuit, (ii) a plurality of encoders and (iii) a multiplexer circuit. The segmentor circuit may be configured to segment a picture into a plurality of strips. Each of the plurality of encoders may be configured (i) to encode respective strips of the plurality of strips in parallel and (ii) to transfer context information with at least one other encoder of the plurality of encoders. The multiplexer circuit may be configured to combine the encoded strips from the plurality of encoders into an encoded bit stream.

36 Claims, 9 Drawing Sheets

AVAILIABLE JUST BEFORE TIME 8 FROM PICTURE 0 AS A REFERENCE FOR CHIP 1

NOT AVAILIABLE JUST BEFORE TIME 8 FROM PICTURE 0 AS A REFERENCE FOR CHIP 1

SEARCH RANGE

| CHIP 0 | CHIP 1 | CHIP 2 | CHIP 3 | CHIP 4 |
|---|---|---|---|---|
| 0 | 2 | 4 | 6 | 8 |
| 1 | 3 | 5 | 7 | 9 |
| 2 | 4 | 6 | 8 | 10 |
| 3 | 5 | 7 | 9 | 11 |
| 4 | 6 | 8 | 10 | 12 |
| 5 | 7 | 9 | 11 | 13 |
| 6 | 8 | 10 | 12 | 14 |
| 7 | 9 | 11 | 13 | 15 |
| 8 | 10 | 12 | 14 | 16 |
| 9 | 11 | 13 | 15 | 17 |
| 10 | 12 | 14 | 16 | 18 |
| 11 | 13 | 15 | 17 | 19 |
| 12 | 14 | 16 | 18 | 20 |
| 13 | 15 | 17 | 19 | 21 |
| 14 | 16 | 18 | 20 | 22 |
| 15 | 17 | 19 | 21 | 23 |
| 16 | 18 | 20 | 22 | 24 |
| 17 | 19 | 21 | 23 | 25 |
| 18 | 20 | 22 | 24 | 26 |
| 19 | 21 | 23 | 25 | 27 |
| 20 | 22 | 24 | 26 | 28 |
| 21 | 23 | 25 | 27 | 29 |
| 22 | 24 | 26 | 28 | 30 |
| 23 | 25 | 27 | 29 | 31 |
| 24 | 26 | 28 | 30 | 32 |
| 25 | 27 | 29 | 31 | 33 |
| 26 | 28 | 30 | 32 | 34 |
| 27 | 29 | 31 | 33 | 35 |
| 28 | 30 | 32 | 34 | 36 |
| 29 | 31 | 33 | 35 | 37 |
| 30 | 32 | 34 | 36 | 38 |
| 31 | 33 | 35 | 37 | 39 |
| 32 | 34 | 36 | 38 | 40 |
| 33 | 35 | 37 | 39 | 41 |

☐ T

AREA ENCODED AT TIME T

FIG. 11

PARALLEL VIDEO ENCODER WITH WHOLE PICTURE DEBLOCKING AND/OR WHOLE PICTURE COMPRESSED AS A SINGLE SLICE

FIELD OF THE INVENTION

The present invention relates to video compression generally and, more particularly, to a parallel video encoder with whole picture deblocking and/or whole picture compression as a single slice.

BACKGROUND OF THE INVENTION

Video picture data can be compressed for storage and transmission using various compression standards [i.e., MPEG-2, MPEG-4, H.264 and VC-1 (formerly known as VC-9)]. A video picture is divided into macroblocks that are encoded and placed in a compressed bit stream. The H.264 standard provides a macroblock-adaptive field frame (MBAFF) encoding mode. In the MBAFF encoding mode, pairs of vertically adjacent macroblocks are encoded and placed consecutively in the bit stream. As used herein, the term "macroblock (pair)" (or macroblock-pair) refers to a pair of vertically adjacent macroblocks for H.264 MBAFF and a single macroblock for non-H.264 or non-MBAFF encoding.

Advanced video encoder/decoders (CODECs), such as H.264, VC-1, etc., allow improved compression by processing between macroblock (pair) rows. For example, motion vector prediction between macroblock (pair) rows saves on the number of bits needed to compress motion vectors. Statistical context between macroblock (pair) rows saves on the number of bits used when context based entropy coding is used (e.g., as in context-adaptive binary arithmetic coding (CABAC) or context-adaptive variable length code (CAVLC) in H.264 and some header VLCs in VC-1). Intra prediction (H.264) or AC prediction (VC-1 and MPEG-4) across macroblock (pair) rows saves on the number of bits used to encode intra macroblocks. Deblocking between macroblock (pair) rows improves the subjective quality of the picture being encoded and makes the picture being encoded a better reference for other pictures.

For H.264, VC-1, MPEG-2 and MPEG-4 processing, the technique of motion vector prediction between macroblock (pair) rows cannot be used across slice boundaries. For H.264 and VC-1, the technique of statistical context between macroblock (pair) rows cannot be used across slice boundaries. For H.264, VC-1 and MPEG-4, the technique of intra prediction or AC prediction across macroblock (pair) rows cannot be used across slice boundaries. In order to get the advantage of the above techniques, multiple rows need to be coded across slice boundaries. For VC-1, deblocking cannot be used across slice boundaries, whereas for H.264 deblocking may be performed across slice boundaries.

Figure 1:
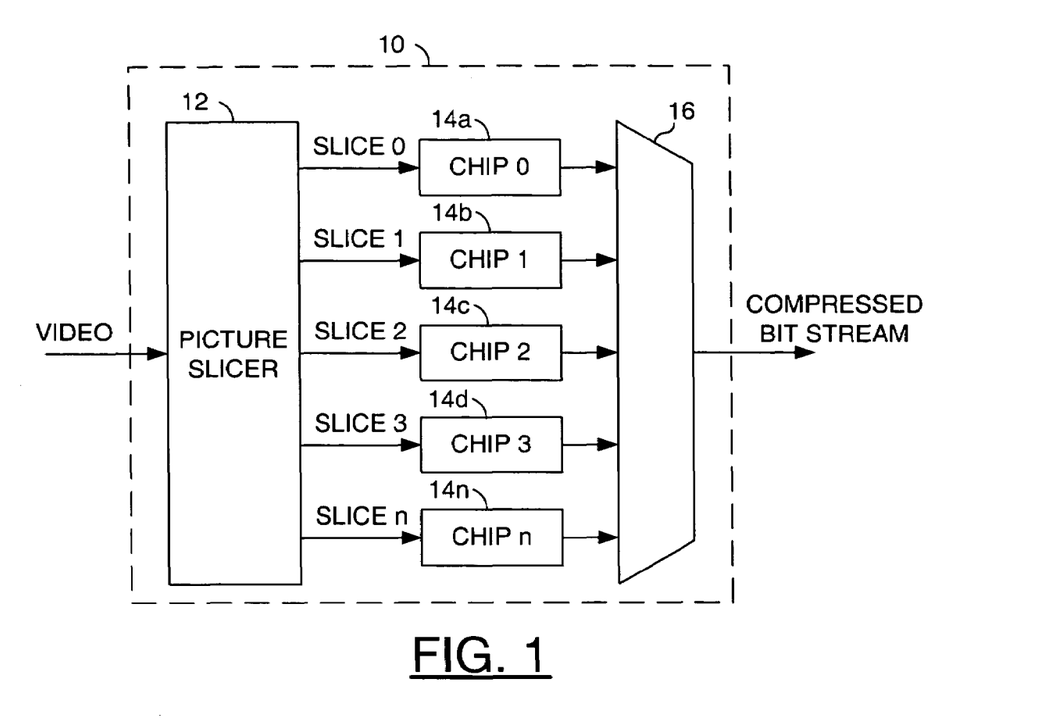
FIG. 1 is a block diagram illustrating a conventional encoder.

Referring to FIG. 1, a block diagram illustrating a conventional parallel encoder 10 is shown. The parallel encoder 10 includes a picture slicer 12, an arbitrary number of encoder chips 14a-14n, and a multiplexer 16. The picture slicer 12 divides a video picture in the video signal VIDEO into a number of slices or strips (i.e., slice 0 through slice n) equal to the number of chips. Each of the encoder chips 14a-14n encodes a corresponding one of the slices, slice 0 through slice n. The multiplexer 16 combines the encoded slices to produce a compressed bit stream.

Figure 2:
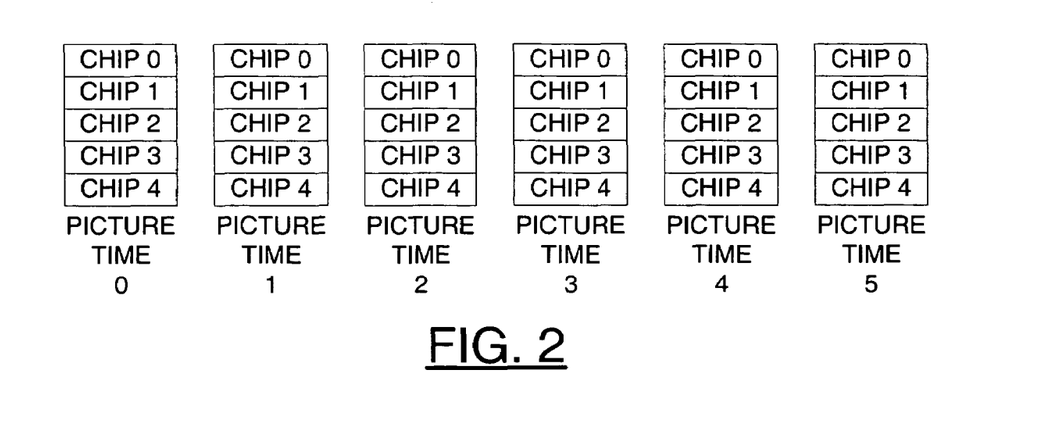
FIG. 2 is a block diagram illustrating a conventional encoding scheme.

Referring to FIG. 2, a block diagram is shown illustrating a conventional parallel encoding scheme using a conventional parallel encoder with five chips. Each picture is broken up into five pieces (i.e., horizontal strips or slices) that are the full width of the picture. During each picture time, each horizontal strip is encoded in normal (raster) order by the corresponding encoder chip. The strips are encoded in parallel (i.e., at the same time). Since the chips are encoding in parallel, the bottom of the area encoded by chip i is not available when chip i+1 starts encoding. Therefore, the slices cannot span chip boundaries and deblocking cannot be performed across chip boundaries.

It would be desirable to implement a method and/or apparatus to provide an efficient parallel video encoder that allows whole pictures to be deblocked and/or compressed as a single slice.

SUMMARY OF THE INVENTION

The present invention concerns an apparatus comprising (i) a segmentor circuit, (ii) a plurality of encoders and (iii) a multiplexer circuit. The segmentor circuit may be configured to segment a picture into a plurality of strips. Each of the plurality of encoders may be configured (i) to encode respective strips of the plurality of strips in parallel and (ii) to transfer context information with at least one other encoder of the plurality of encoders. The multiplexer circuit may be configured to combine the encoded strips from the plurality of encoders into an encoded bit stream.

The objects, features and advantages of the present invention include providing a method and/or apparatus for parallel video encoding that may (i) provide whole picture deblocking, (ii) provide whole picture compression as a single slice, (iii) reduce the number of bits used by the encoder, (iv) eliminate slice borders, (v) provide more efficient motion vector prediction than conventional techniques, (vi) provide more efficient entropy encoding than conventional techniques, (vii) reduce or eliminate visible seams from deblocking everywhere except across chip borders, transfer data between encoder chips, (viii) overlap picture times, (ix) encode macroblock (pairs) in a different order from which they are sent, (x) use multiple horizontal strips with single picture encode time, (xi) use multiple horizontal strips with multiple picture encode times, (xii) use vertical strips and/or (xiii) improve image quality.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 3:
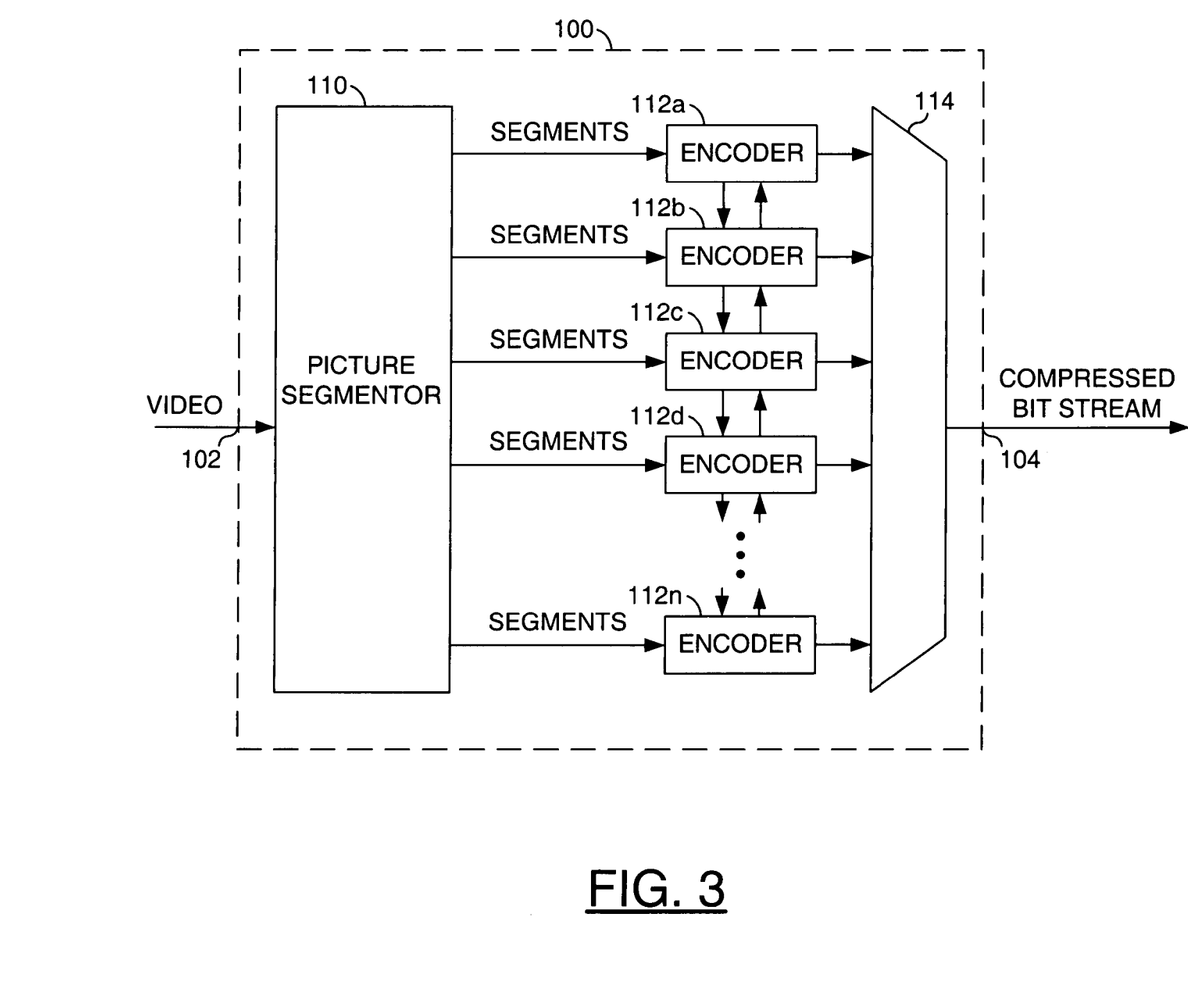
FIG. 3 is a block diagram illustrating a parallel encoder in accordance with a preferred embodiment of the present invention.

Referring to FIG. 3, a block diagram of a circuit 100 is shown illustrating a video encoder in accordance with a preferred embodiment of the present invention. The circuit 100 may be implemented, in one example, as a parallel encoding circuit. The circuit 100 may have an input 102 that may receive a video signal (e.g., VIDEO) and an output 104 that may present a compressed bit stream (e.g., BITSTREAM). The signal VIDEO generally comprises a plurality of pictures (or images). The circuit 100 may be configured to generate the signal BITSTREAM in response to a plurality of picture segments generated from the signal VIDEO.

The circuit 100 may comprise a circuit 110, a number of circuits 112a-112n and a circuit 114. The circuit 110 may be implemented, in one example, as a picture segmentor. The circuits 112a-112n may be implemented, in one example, as video encoding circuits. In one example, the circuits 112a-112n may be implemented as individual video encoder chips. The circuits 112a-112n may be compliant with one or more encoding standards (e.g., H.264, VC-1, etc.). The circuit 114 may be implemented, in one example, as a multiplexing circuit. In one example, the circuit 114 may be implemented as a statistical multiplexer (or STATMUX) circuit.

The circuit 110 may be configured to generate a plurality of segments (or strips) for each individual picture in the signal VIDEO. In one example, the circuit 110 may be configured such that the number of segments per picture may be greater than the number of circuits 112a-112n. The circuit 110 may be further configured to generate the number of segments per picture such that the number of segments is not an integer multiple of the number of encoding circuits 112a-112n.

The circuits 112a-112n may each comprise a first input that may receive a number of segments from the circuit 110, a second input that may receive information from another one of the circuits 112a-112n, an output that may present information to another of the circuits 112a-112n and an output that may present an encoded bit stream to a respective input of the circuit 114. The circuits 112a-112n may be configured to exchange context information regarding the respective segments being encoded. For example, the circuits 112a-112n may be configured to exchange segment data, reference data, information about skip runs and/or any other data that may be useful to meet the design criteria of a particular implementation. The circuits 112a-112n may be configured to support both high and low latency transfers between one another. The circuit 114 may be configured to generate the signal BITSTREAM in response to the individual encoded bit streams received from the circuits 112a-112n.

The present invention may provide several embodiments of parallel encoders that may encode whole pictures as single slices and/or deblock whole pictures across chip boundaries. As used herein, the term "chip boundary" generally refers to a border in the picture between areas encoded by different encoder chips. In general, the present invention may provide a number of parallel encoders with a property in common that when a macroblock (pair) is encoded, a context of the macroblock (pair) is known to the chip that is encoding the macroblock (pair).

As used herein, the term context generally refers to information from encoding other parts of the picture that may be used for encoding a segment and/or deblocking. The context may include, but is not limited to (i) motion vectors from macroblock (pairs) above, to the left, above left, and above right, (ii) a number of coefficients/block in macroblock (pairs) above and to the left (e.g., used for entropy context in H.264 and VC-1), (iii) intra prediction samples (H.264) or AC prediction coefficients (VC-1) and (iv) non-deblocked, deblocked, or partially deblocked samples for deblocking from block in macroblock (pairs) above and to the left (e.g., used for deblocking across chip boundaries).

In general, the present invention generally controls the order of encoding such that the context data is available. In one example, the context data may be produced on one encoder chip (e.g., 112i) and used on the same encoder chip and/or produced on one encoder chip (e.g., 112i) and transferred to another encoder chip (e.g., 112j). The present invention may provide an encoder circuit that may produce a bit stream BITSTREAM out of order. For example, for some integers J and K: a macroblock (pair) J may be placed in the bit stream BITSTREAM before a macroblock (pair) K. However, the macroblock (pair) K may be encoded before the macroblock (pair) J. Alternatively, the present invention may provide an encoder circuit configured to produce the bit stream in order.

In one example, the present invention may provide an encoder circuit that may be configured to generate an H.264 CAVLC stream or VC-1 stream directly. For example, each segment that is encoded in order may be generated and the segments concatenated. In general, the concatenation may be "bit" concatenation to meet the constraints of a particular application.

Each macroblock (pair) generally uses an integer number of bits that may not be a multiple of 8 (e.g., the number of bits may not be an integer number of bytes). At the end of a segment, data may be byte aligned by stuffing 0's before the next segment start (or picture start, if at the end of a picture). However, bit stuffing inside a segment is neither allowed (by the standard) or desirable (because bits are wasted).

In all embodiments where a chip produces less than a whole, the respective bit stream may not be an integer number of bytes. In one example, two encoder chips may be implemented, and (to keep things simple) each chip may produce 1001 bits comprising one-half of the picture. Because programmable computers as well as special purpose ASICs and ASSPs generally use byte addressing/storage, the first 1001 bits=125 bytes+1 bit cannot be simply concatenated with the second.

Instead, the streams are "stitched together". Specifically, the first 125 bytes of the output stream are the first 125 bytes produced by the first chip. The next byte in the output stream comprises the last bit from the first chip and bits 0-6 from the second chip. The next byte comprises bits 7-14 from the second chip (e.g., which come from bytes 0 and 1 produced by the second chip). The penultimate byte comprises bits 991-998 from the second chip (e.g., which come from bytes 123 and 124 produced by the second chip). The last byte comprises bits 999-1000 from the second chip (from bytes 124 and 125) plus 6 stuffing bits. While the above process may seem very complex, the process is generally not demanding in terms of processing power because typical compressed bit rates are generally low.

An H.264 CABAC stream is generated in order. In one embodiment, the present invention may be implemented to generate an H.264 CABAC stream directly (e.g., where one horizontal strip per chip with picture overlap, raster order is implemented). However, in general, the present invention may implement encoder circuits that do not generate the CABAC stream directly. Instead, a representation of the stream may be generated (e.g., CAVLC, etc.) and the representation trans-coded to CABAC. An example of such a trans-coding process may be found in co-pending application U.S. Ser. No. 10/284,498, filed Oct. 30, 2002, which is incorporated herein by reference in its entirety.

In general, two methods may be implemented for performing the trans-coding: (i) one master chip may be configured to perform all of the trans-coding; (ii) different chips may be configured to trans-code different slices. The use of one master chip is generally the simpler of the two methods. When different chips trans-code different slices, if one slice/picture is implemented, then different chips trans-code different pictures. One method to parallelize the process with different chips trans-coding different slices is to send the next slice to be trans-coded to the chip that is least burdened (e.g., has the fewest number of bytes waiting to be trans-coded). The second method generally achieves more parallelism.

Figure 4:
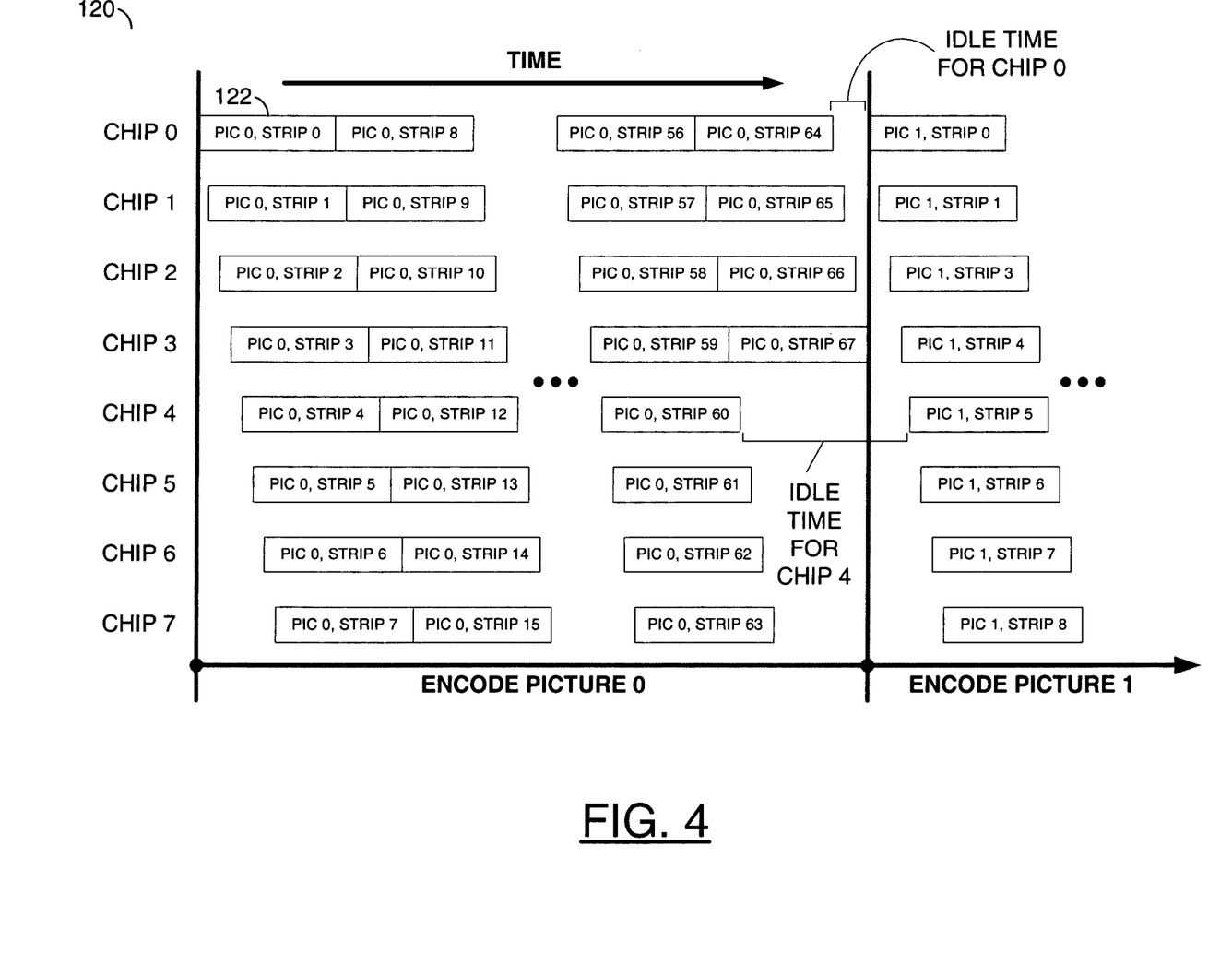
FIG. 4 is a diagram illustrating an example encoding scheme in accordance with a preferred embodiment of the present invention.

Referring to FIG. 4, a block diagram illustrating an encoding scheme 120 in accordance with the present invention is shown. In one example, each picture may be broken up into multiple horizontal strips 122. In general, the number of horizontal strips 122 may be greater then the number of encoder circuits 112a-112n. For example, an encoder circuit (e.g., 112i) may be configured to process strips i, i+n, i+2n, etc., where n is the total number of encoder circuits 112a-112n. As the circuit 112i finishes the bottom macroblock (pair) row of the strip i+Kn (for some integer K), the circuit 112[(i+1) modulo n] may begin compressing strip i+Kn+1.

When the above method is implemented, at the beginning of the encode time the lower chips are generally idle. In one example, a number of strips (e.g., 68) may be implemented that is not a multiple of the number of encoder circuits (e.g., 8). Having the number of strips not be a multiple of the number of chips generally results in some additional idling of the lower encoder circuits at the end of each picture encode time (e.g., an idle time for a chip 0 may be smaller than an idle time for the chip 4). However, the number of encoder circuits implemented may be set large enough to make the idle time small in order to achieve a high degree of parallelism. In the example illustrated in FIG. 4, the greatest degree of parallelism is generally achieved by setting the strip height to one macroblock (pair) row.

Figure 5:
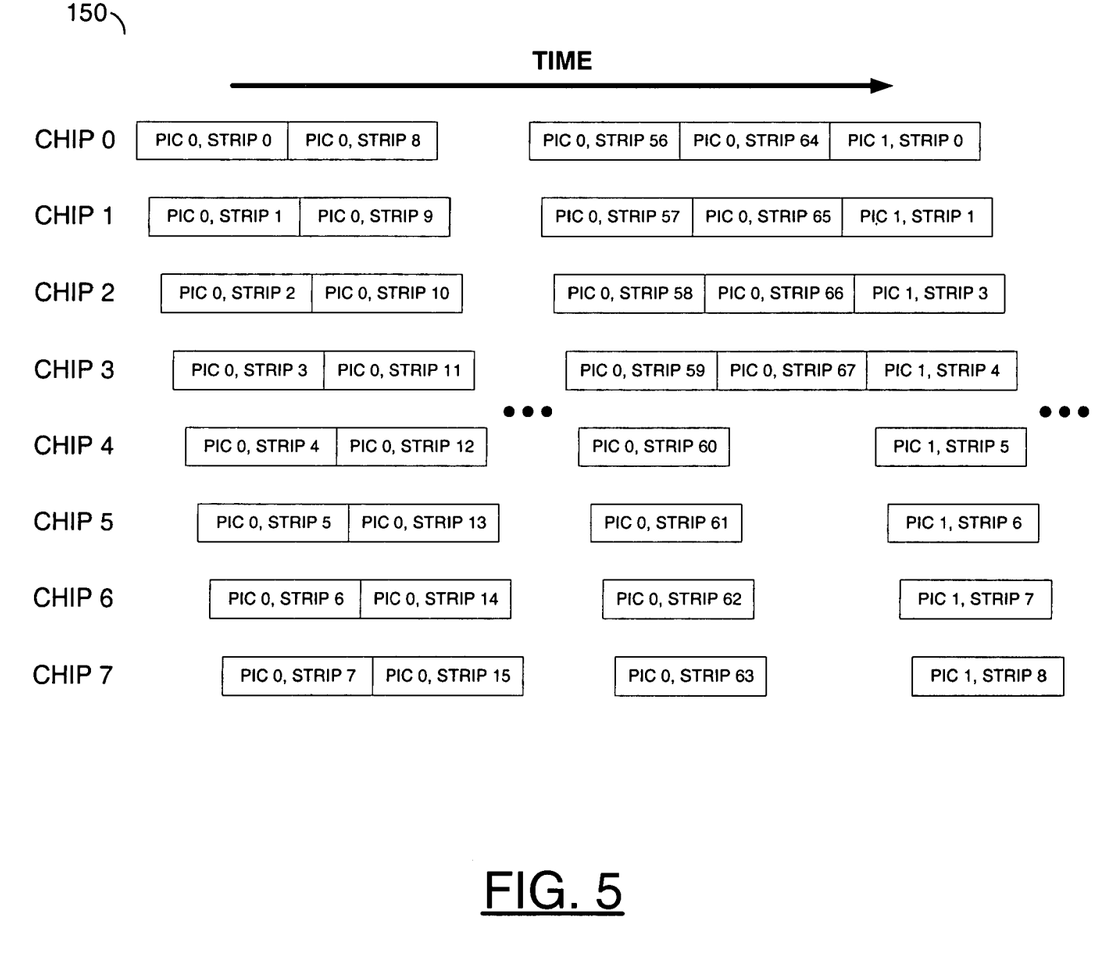
FIG. 5 is a diagram illustrating another example encoding scheme in accordance with a preferred embodiment of the present invention.

Referring to FIG. 5, a diagram is shown illustrating an encoding scheme 150 in accordance with another preferred embodiment of the present invention. The encoding scheme 150 is generally similar to the encoding scheme 120 (described in connection with FIG. 4 above), except that a strip (or segment) from a next picture may start to be encoded as soon as an appropriate encoder circuit becomes available. In one example, each encoding circuit (chip) gets the same strips in each picture. In general, there is idling of chips, but only to the degree that the number of strips is not a multiple of the number of chips.

Figure 6:
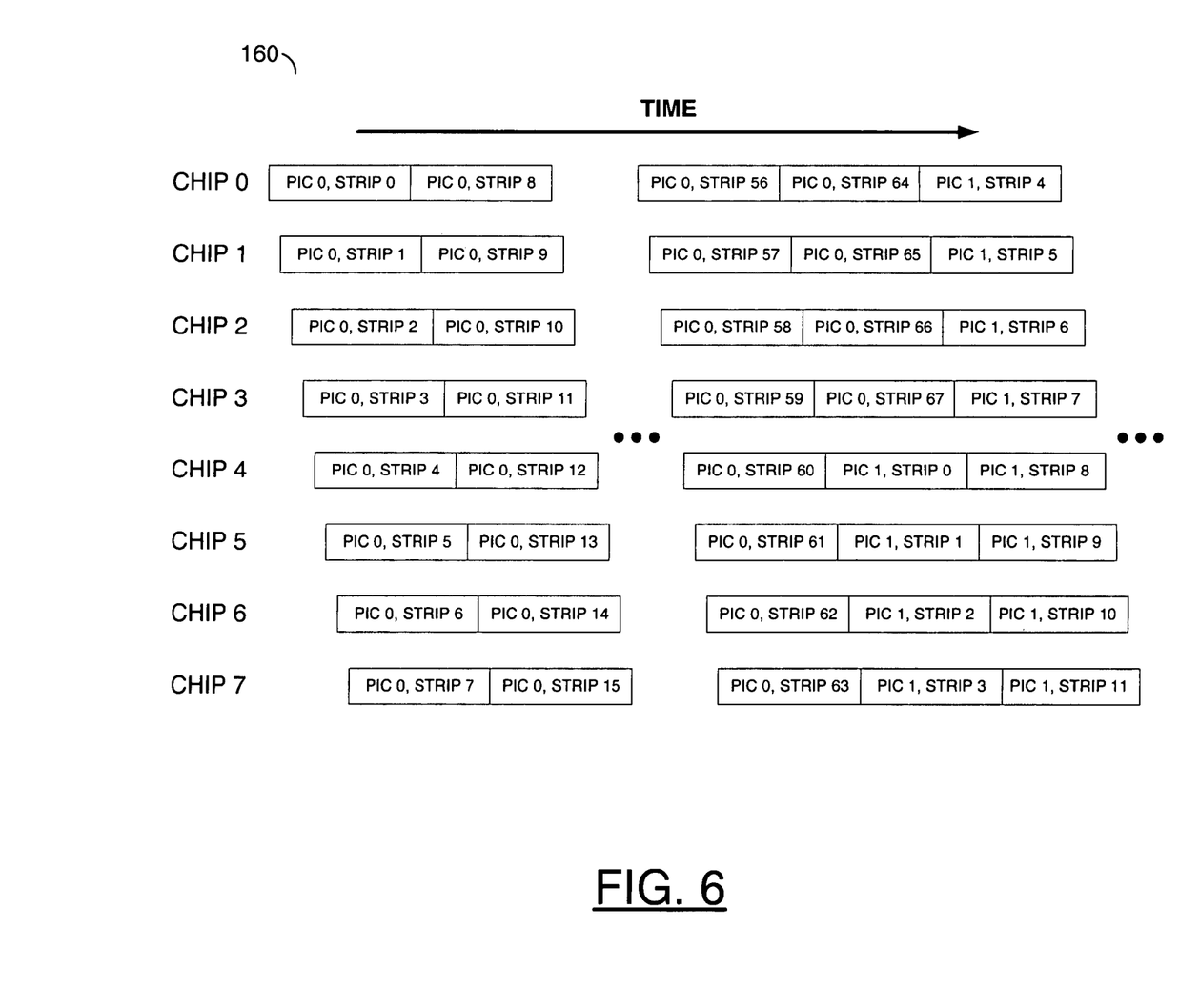
FIG. 6 is a diagram illustrating still another encoding scheme in accordance with a preferred embodiment of the present invention.

Referring to FIG. 6, a diagram is shown illustrating an encoding scheme 160 in accordance with another embodiment of the present invention. Each of the encoding circuit 112a-112n may be assigned strips (or segments) from a subsequent picture K+1 in the order in which each circuit becomes available (e.g., freed up from encoding the current picture K). In this embodiment, greater parallelism may be achieved. In general, there is no loss of time (e.g., idling) when the number of strips is not a multiple of the number of chips.

Figure 7:
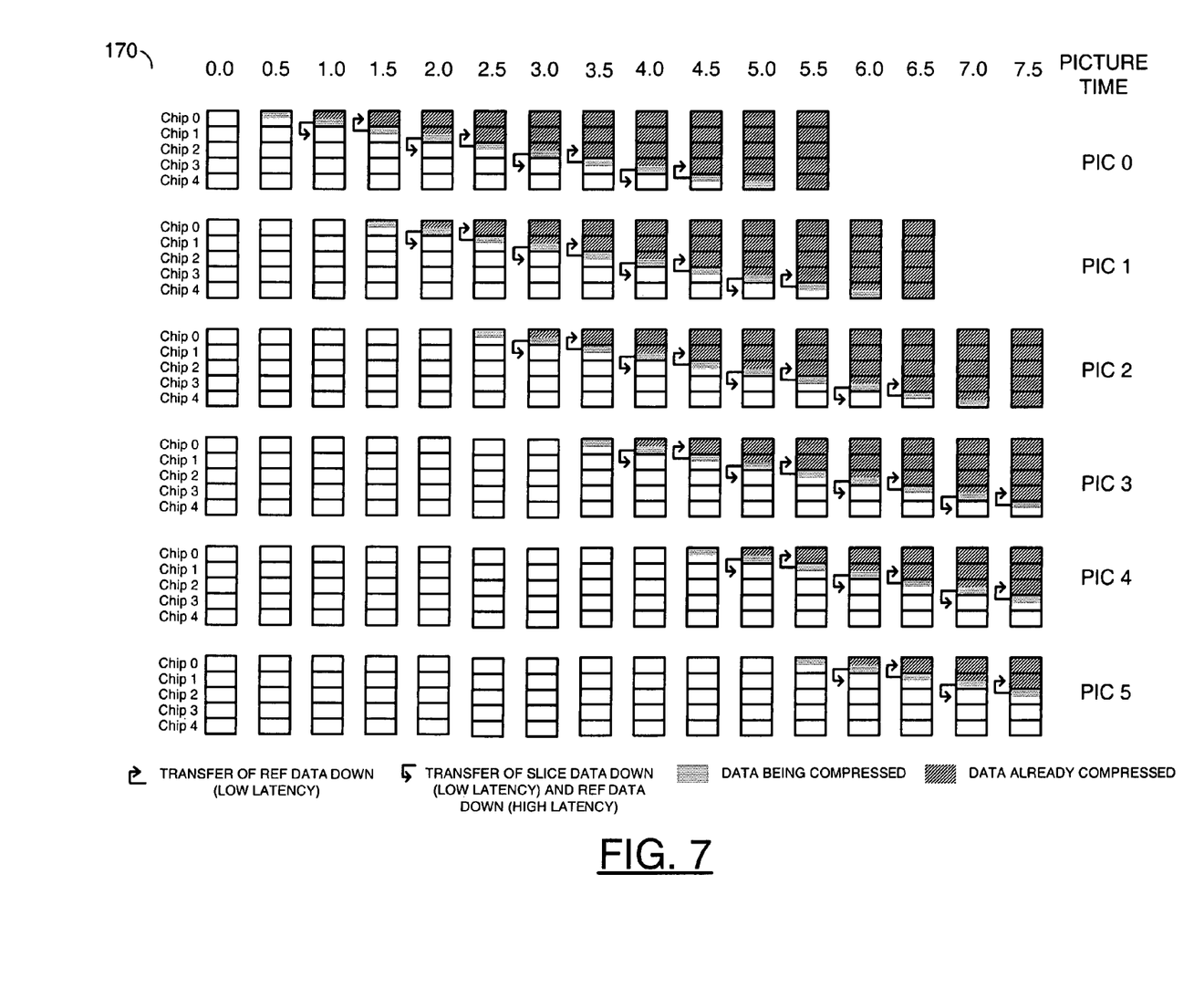
FIG. 7 is flow diagram illustrating encoding of a number of pictures over a number of picture times.

Referring to FIG. 7, a diagram is shown illustrating an encoding scheme 170 implementing one horizontal strip (or segment) per encoding circuit (or chip) with picture overlap in raster order. The encoding scheme 170 illustrated in FIG. 7 is a degenerate form of the scheme that implements multiple horizontal strips with multiple picture encode times (described above in connection with FIGS. 5 and 6). The encoding scheme illustrated in FIG. 7 has the advantage that the picture is encoded in order (e.g., macroblock (pair) M is always encoded after macroblock (pair) M−1). When the embodiment illustrated in FIG. 7 is implemented, there is generally no need to "bit align" the segments. The embodiment illustrated in FIG. 7 may be implemented to encode pictures into CABAC format directly (e.g., without a separate trans-code step).

However, the embodiment illustrated in FIG. 7 may have a disadvantage when one picture is a references for another picture.

In an example where a picture (e.g., P in encode order) is used as a reference for another picture (e.g., P+1), when chip C+1 is encoding a corresponding strip of picture P+1, chip C is generating a corresponding strip of picture P. Because the strip of picture P+1 and the strip of picture P are adjacent, the data that chip C+1 is reconstructing for the strip of picture P+1 is needed by chip C to encode the strip of picture P.

Encoding may be performed without a problem by (i) implementing a vertical search range less than one strip height and (ii) transferring reconstructed data up at low latency. If the vertical search range is not less than one strip height, chip C needs data that chip C+2 will generate in the next picture time. In practice, a typical search height may be at least one macroblock (pair) row less than the height of a strip. Selecting a search height at least one macroblock (pair) row less than the strip height generally allows chips (e.g., C and C+1) to work on the same (relative) macroblock (row) at substantially the same time.

Figure 8:
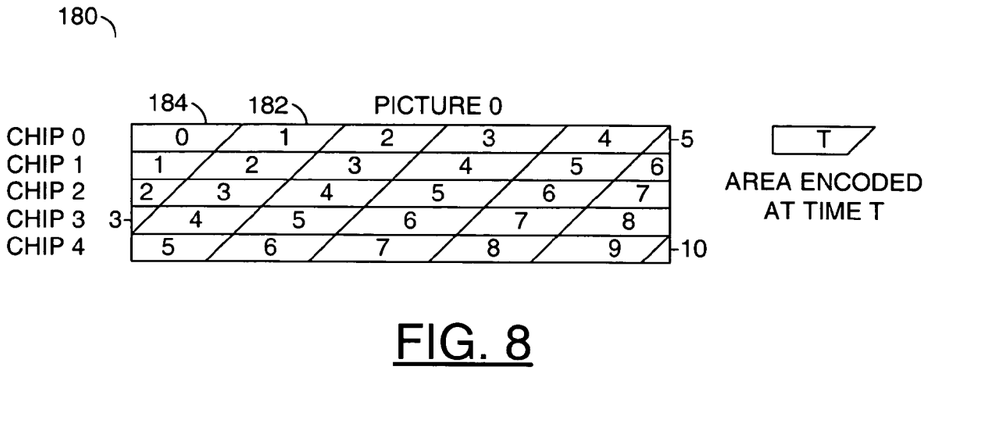
FIG. 8 is a diagram illustrating a parallelogram shaped encoding area in accordance with a preferred embodiment of the present invention.

Referring to FIG. 8, a diagram 180 is shown illustrating another encoding scheme in accordance with a preferred embodiment of the present invention. In one example, an encoding scheme may be implemented using one horizontal strip per chip with picture overlap and parallelogram order. The encoding scheme generally uses the same chip division as the encoding scheme described in more detail above in connection with FIG. 7, except that each chip encodes a respective strip in parallelogram order.

Specifically, each chip encodes macroblocks in parallelogram shaped regions 182 that are the height of the corresponding strip. When a chip finishes encoding the parallelogram shaped region, the chip moves to a region to the right to encode another parallelogram region, etc., until the whole strip is encoded. On the left and right sides of the picture, the parallelogram regions to be encoded are truncated at the edge of the picture. For example, a parallelogram region with a width of P macroblock (pairs) may be encoded using the following processes.

The top chip (e.g., chip 0) encodes a left side truncated parallelogram region (e.g., the region 184) of a corresponding strip as follows: encode macroblock (pair)s [0, P−1] from row 0; encode macroblock (pair)s [0, P−2] from row 1; . . . ; encode macroblock (pair)s [0, P−R(0)] from row R(0)−1. In general, row R is not finished before row R+1 is started.

However, context is always available from the row above even for the "above right" macroblock (pair).

The top chip (e.g., chip 0) encodes a first full parallelogram region of the corresponding strip as follows: encode macroblock (pair)s [P, 2P−1] from row 0; encode macroblock (pair)s [P−1, 2P−2] from row 1; . . . ; encode macroblock (pair)s [P−R(0)+1, 2P−R(0)] from row R(0)−1. Additional full parallelogram regions of the corresponding strip are encoded similarly to the first full parallelogram region, but are shifted over by P macroblock (pair)s. The top chip (e.g., chip 0) encodes a rightmost truncated parallelogram region of the corresponding strip similarly to the full parallelogram regions, except that encoding does not pass the right edge of the picture.

The remaining chips (e.g., 1, 2, 3, etc.) are generally configured to encode the corresponding strips using the following processes. When a chip K−1, where K≧0, (i) finishes encoding a truncated parallelogram region that contains m≧2 macroblock (pair)s on the bottom row of the region and (ii) transfers the intra-picture data for the macroblock (pair)s to a chip K, chip K begins encoding a corresponding left-edge truncated parallelogram region. The number of macroblock (pair)s encoded on the first row of the truncated parallelogram region corresponding to chip K is m−1. The first full parallelogram region begins where the truncated parallelogram region ended. Chip K may begin encoding the first full parallelogram region when the chip K−1 finishes the corresponding first full parallelogram region and transits the intra-picture data to chip K. Additional full parallelogram regions and the right-most truncated parallelogram region are generally encoded as the chip K−1 finishes additional full (or truncated) parallelogram regions and transmits the intra-chip data to chip K.

Figure 9:
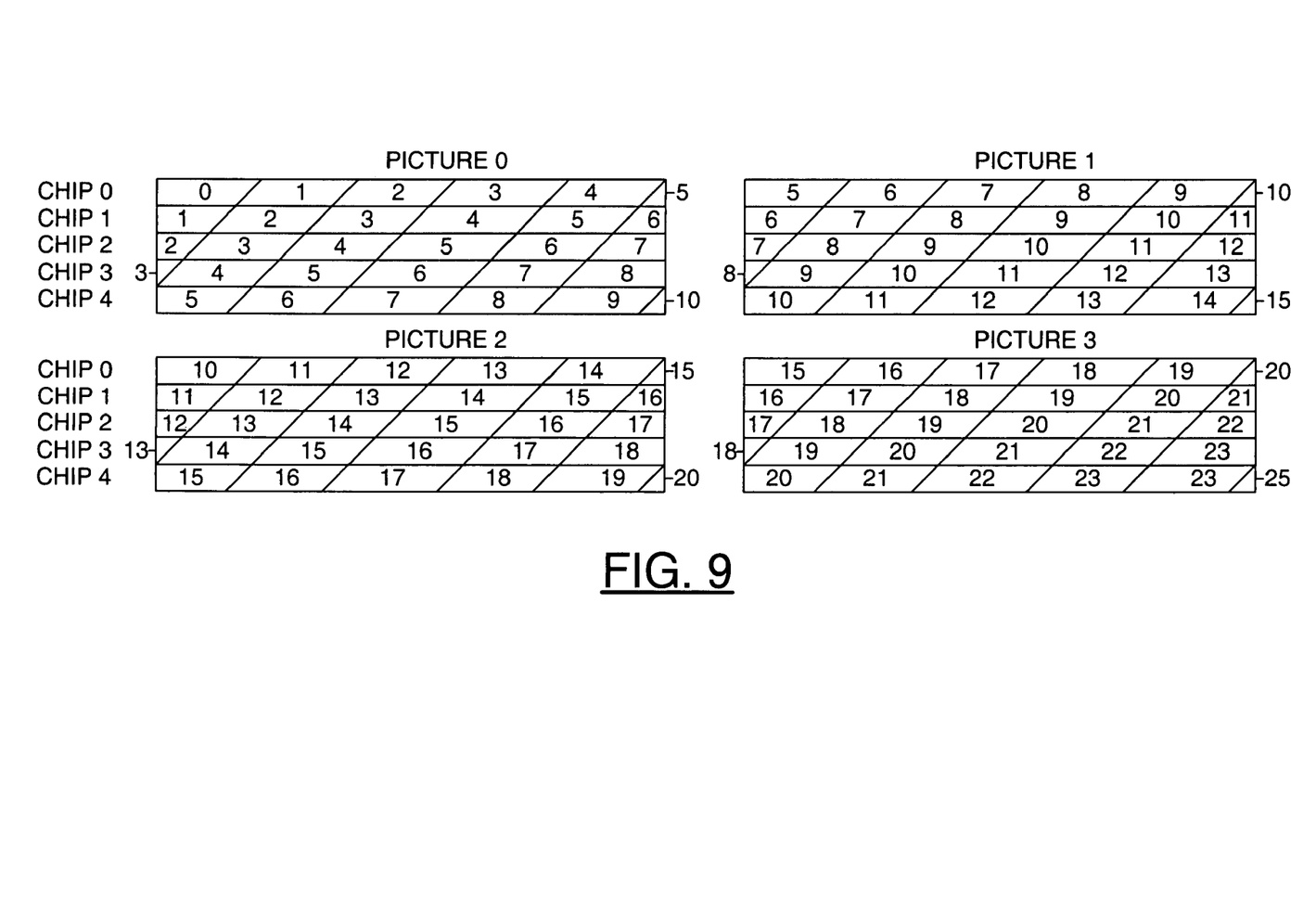
FIG. 9 is a block diagram illustrating an example of encoding a number of pictures using the parallelogram shaped encoding area illustrated in FIG. 8.

Referring to FIG. 9, a diagram is shown illustrating encoding of multiple pictures using the encoding scheme of FIG. 8. An encoder in accordance with the present invention may be configured such that when a chip finishes a corresponding strip of one picture, the chip may begin encoding a respective strip of a next picture. Such a configuration generally allows full parallelism, as illustrated in FIG. 9.

In general, a tradeoff is made in choosing the width P of the parallelogram regions 182. A large value of P generally results in fewer segments being encoded. Fewer segments generally means less stitching together of different segments and fewer macroblocks that are on the parallelogram edges (e.g., which may involve some special processing). A small value of P generally reduces the total clock time that is used to encode a picture (e.g., reduce the number of pictures that are being encoded at any given time). For example, when P is small, a chip (e.g., C+1) can start sooner compared to the start time of the chip C (e.g., the delay between the two chip start times is the time it takes to encode P macroblocks plus any communication latency). Since the lower chips start sooner relative to the top chip, there is less time from when the top chip starts until the bottom chip finishes.

The encoding scheme illustrated in FIG. 8 may be less desirable than the encoding scheme illustrated in FIG. 7 for the following reasons. The parallelogram method of FIG. 8 is generally more complex (e.g., each chip does not encode associated macroblock (pairs) in order). The bit stream generated by the encoding scheme of FIG. 8 is not encoded in order. Since the bit stream is not encoded in order, the bit stream cannot be encoded directly into CABAC.

The encoding scheme illustrated in FIG. 8 may provide advantages over the encoding scheme illustrated in FIG. 7 for the following reasons. The encoding scheme of FIG. 8 reduces the amount of time used to encode a picture (from beginning to end). For example, for a 5 chip system raster order (FIG. 7) encoding generally takes 5 picture times, whereas with the example parallelogram width in FIGS. 8 and 9 only two picture times are used. For example, each strip may be divided into five parallelogram regions (e.g., five parallelogram times=1 picture time). As illustrated in FIG. 8, a picture may be encoded from beginning to end in ten parallelogram times. Also, reconstructed data around an area that is to be encoded is generally available sooner.

Figure 10:
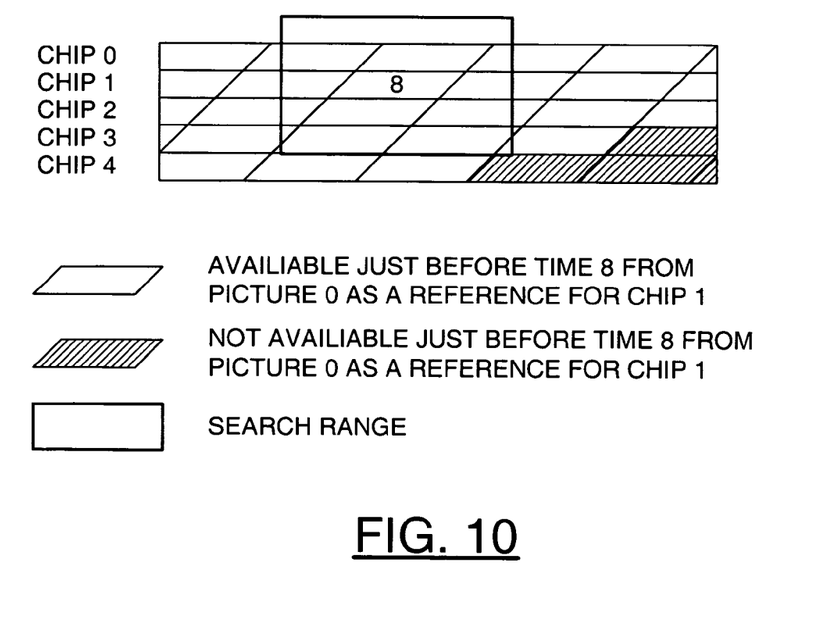
FIG. 10 is a diagram illustrating a search range, available data, unavailable data and an encoding process of the present invention.

Referring to FIG. 10, an example search range is shown illustrating the reference data available at an example time 8 for the chip divisions and parallelogram regions as shown in FIGS. 8 and 9. The scheme illustrated in FIG. 8 generally allows a vertical search range greater than the strip height. The unshaded parallelogram regions are generally available just before the time 8 from picture 0 as a reference for chip 1. The shaded parallelogram regions are generally not available just before the time 8 from picture 0 as a reference for chip 1. The search region may be implemented, in one example, as a rectangle.

Figure 11:
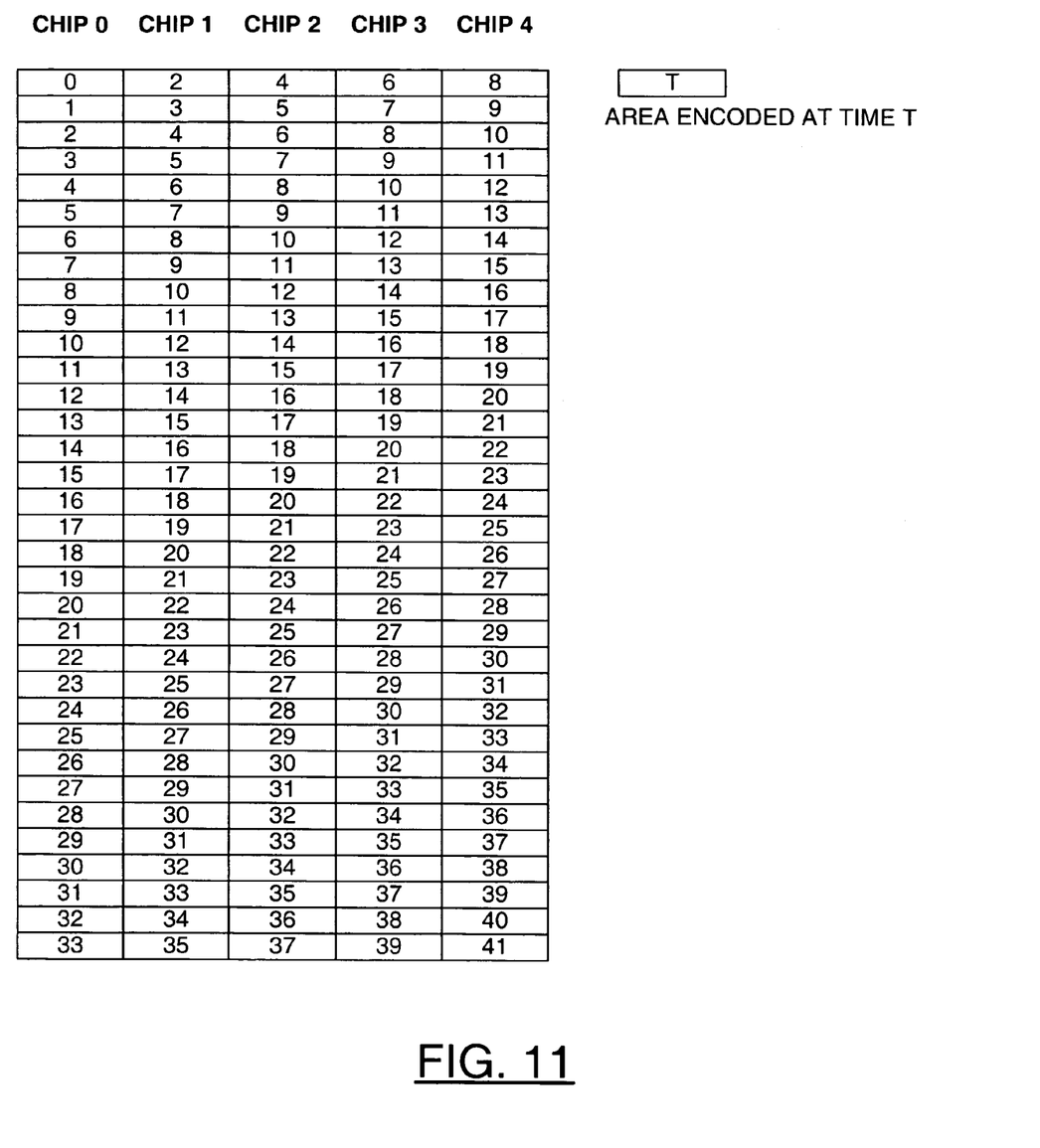
FIG. 11 is a diagram illustrating an encoding scheme in accordance with the present invention using vertical strips.

Referring to FIG. 11, a diagram is shown illustrating an encoding scheme in accordance with another embodiment of the present invention. In one example, each picture may be segmented into vertical strips and an encoder may be implemented with an individual encoder chip for each of the vertical strips. For example, FIG. 11 illustrates an example of a parallel encoder comprising five encoder chips, where the picture is segmented into five vertical strips and each vertical strip includes 34 macroblock (pair) rows. Each chip is assigned one vertical strip. After a chip (e.g., chip C) reaches the right side for macroblock (pair) row (e.g., Y), the chip C may be configured to send context information to an adjacent chip (e.g., a chip C+1) that allows the chip C+1 to start encoding row 0 in the corresponding strip. In one example, a whole chip/macroblock (pair) row, time may be used to transfer data. For example, during row time 1, data from row 0 computed on chip 0 may be transferred to chip 1, so that in row time 2 chip 1 may begin encoding row 0. When a whole chip/macroblock (pair) row time is taken to transfer data, there are 8 row times where, for each chip, the chip is not compressing the current picture but some other chip is (e.g., chip 0 from 34-41, chip 1 from 0-1 and 35-41, etc.).

The embodiment illustrated in FIG. 11 may be implemented with two variations. In the first variation, all chips finish one picture before starting another picture. The first variation is simple but may be less efficient. In the second variation, when each chip finishes encoding one picture, the chip starts encoding the next picture. The second variation is more complex, but more efficient.

The encoding scheme of FIG. 11, with vertical strips, may be less desirable than the encoding scheme illustrated in FIG. 7, because with vertical strips, each chip produces many segments per picture. Therefore, the data that one chip produces for one picture will not be contiguous in the bit-stream. However, the encoding scheme of FIG. 11 may be more desirable than the encoding scheme illustrated in FIG. 7, because with vertical strips, each chip needs to complete only a small part of a strip (e.g., one macroblock (row) of the strip) before the next chip can start. Thus, the implementation of vertical strips may eliminate issues related to search range. Even when picture times are overlapped, two pictures at most are encoded at any given time.

The present invention generally splits up a picture geometrically and encodes the picture as one slice and/or de-blocks across the whole picture. The present invention generally provides improved image quality over conventional solutions. For example, slice borders make the encoder use more bits. Therefore, motion vector prediction and entropy encoding is less efficient. Slice borders may create visible seams in H.264, where the encoder must select intra prediction modes that do not use data from other slices. Not deblocking across chip borders—but otherwise deblocking elsewhere—may create visible seams. The present invention generally eliminates the effects of slice borders.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a segmentor circuit configured to segment a picture into a plurality of strips;
   a plurality of encoders, wherein each encoder is configured (i) to encode respective ones of said plurality of strips in parallel with the other encoders and (ii) to transfer context information with at least one other encoder of said plurality of encoders, wherein each of said plurality of encoders comprises an individual encoder chip and encodes the respective strips based upon the context information received from another encoder chip, and said context information comprises one or more motion vectors; and
   a multiplexer circuit configured to combine the encoded strips from said plurality of encoders into an encoded bit stream.

2. The apparatus according to claim 1, wherein each of said strips comprises a plurality of regions comprising a set of macroblock-pairs that do not appear contiguously in said encoded bitstream and each of said plurality of encoders encodes respective regions in sequence.

3. The apparatus according to claim 2, wherein said plurality of regions comprises parallelogram regions.

4. The apparatus according to claim 2, wherein said plurality of regions comprises a number of regions that is not an integer multiple of a number of encoders in said plurality of encoders.

5. The apparatus according to claim 1, wherein said plurality of strips comprises vertical strips.

6. The apparatus according to claim 5, wherein each of said plurality of encoders is configured to encode one of said plurality of vertical strips.

7. The apparatus according to claim 5, wherein each of said plurality of encoders is further configured (I) to encode a first portion of said respective strip, (ii) to transfer context information to said at least one other encoder and (iii) to encode a remaining portion of said respective strip.

8. The apparatus according to claim 1, wherein said plurality of strips comprises horizontal strips.

9. The apparatus according to claim 8, wherein said plurality of encoders is configured to encode said plurality of horizontal strips one horizontal strip per encoder in raster order.

10. The apparatus according to claim 8, wherein said plurality of encoders is configured to encode said plurality of horizontal strips one horizontal strip per encoder in parallelogram order.

11. The apparatus according to claim 8, wherein said plurality of encoders is configured to encode more than one picture at a time.

12. The apparatus according to claim 1, wherein said multiplexer circuit is configured to bit-align the encoded strips generated by said plurality of encoders into a single compressed bit stream.

13. The apparatus according to claim 1, wherein said plurality of encoders is configured to encode said picture as a single slice.

14. The apparatus according to claim 1, wherein said apparatus is configured to deblock said picture across all of said plurality of encoders.

15. The apparatus according to claim 14, wherein said plurality of encoders are configured to exchange non-deblocked samples, partially deblocked samples, or fully deblocked samples for deblocking across encoder chip boundaries.

16. The apparatus according to claim 1, wherein said plurality of encoders are configured to exchange intra picture data comprising at least one of reconstructed samples or transform coefficients for intra prediction.

17. The apparatus according to claim 1, wherein said plurality of encoders is configured to encode multiple pictures simultaneously.

18. The apparatus according to claim 1, wherein said plurality of encoders is configured to encode macroblock-pairs in a different order than said macroblock-pairs are placed in said encoded bit stream.

19. An apparatus comprising:
   means for segmenting a picture into a plurality of strips; and
   a plurality of encoding means for encoding said plurality of strips in parallel, wherein each of said plurality of encoding means is configured to (i) transfer context information with at least one other encoding means of said plurality of encoding means and (ii) encode a respective strip based upon context information received from the at least one other encoding means of said plurality of encoding means, wherein said context information comprises one or more motion vectors.

20. A method for encoding a video signal comprising the steps of:
   segmenting a picture into a plurality of strips; and
   configuring each of a plurality of encoders (i) to encode respective strips of said plurality of strips in parallel with the other encoders, (ii) to transfer context information to at least one other encoder of said plurality of encoders and (iii) receive context information from at least one other encoder of said plurality of encoders, wherein each of said plurality of encoders comprises an individual encoder chip and encodes the respective strips based upon the context information received from another encoder chip, and said context information comprises one or more motion vectors.

21. The method according to claim 20, wherein each of said strips comprises a plurality of regions comprising a set of macroblock-pairs that are not placed contiguously in said encoded bit stream and each of said plurality of encoders is configured to encode respective regions in sequence.

22. The method according to claim 21, wherein said plurality of regions comprises parallelogram regions.

23. The method according to claim 21, wherein said plurality of regions comprises a number of regions that is not an integer multiple of a number of encoders in said plurality of encoders.

24. The method according to claim 20, wherein said plurality of strips comprises vertical strips.

25. The method according to claim 24, wherein each of said plurality of encoders is configured to encode one of said plurality of vertical strips.

26. The method according to claim 24, wherein each of said plurality of encoders is further configured (i) to encode a first portion of said respective strip, (ii) to transfer context information to at least one other encoder and (iii) to encode a remaining portion of said respective strip.

27. The method according to claim 20, wherein said plurality of strips comprises horizontal strips.

28. The method according to claim 27, wherein said plurality of encoders is configured to encode said plurality of horizontal strips one horizontal strip per encoder in raster order.

29. The method according to claim 27, wherein said plurality of encoders is configured to encode said plurality of horizontal strips one horizontal strip per encoder in parallelogram order.

30. The method according to claim 27, wherein said plurality of encoders is configured to encode more than one picture at a time.

31. The method according to claim 20, further comprising the step of:

bit-aligning a plurality of encoded bit streams generated by said plurality of encoders into a single compressed bit stream.

32. The method according to claim 20, further comprising the step of:

deblocking said picture across all of said plurality of encoders.

33. The method according to claim 32, wherein said plurality of encoders are configured to exchange non-deblocked samples, partially deblocked samples or fully deblocked samples, for deblocking across encoder chip boundaries.

34. The method according to claim 20, further comprising the step of:

exchanging intra picture data among said plurality of encoders, wherein said intra picture data comprises at least one of reconstructed samples or transform coefficients for intra prediction.

35. The method according to claim 20, further comprising the step of:

configuring said plurality of encoders to encode macroblock-pairs in a different order than said macroblock-pairs are placed in said bit stream.

36. The method according to claim 20, wherein said context information comprises information from encoding other parts of the picture that is useful for encoding a segment or deblocking.

* * * * *